United States Patent [19]

Fujii et al.

[11] Patent Number: 5,217,850
[45] Date of Patent: Jun. 8, 1993

[54] OPTICAL RECORDING DISK AND MANUFACTURING METHOD THEREOF

[75] Inventors: Seiro Fujii; Satoshi Jinno; Takamasa Yoshikawa; Takahiro Kobayashi; Masataka Yamaguchi; Nobuyasu Negishi; Nobuaki Onagi; Shinichiro Suzuki, all of Saitama; Masayasu Yamaguchi, deceased, late of Saitama, by Hidekuni Yamaguchi, Fumiko Yamaguchi, legal representatives; Kiyohide Ogasawara, Saitama, all of Japan

[73] Assignee: Pioneer Electronic Corporation, Tokyo, Japan

[21] Appl. No.: 788,083

[22] Filed: Nov. 5, 1991

[30] Foreign Application Priority Data

Feb. 7, 1991 [JP] Japan .................... 3-16656

[51] Int. Cl.⁵ .......................... G11B 7/24; G11B 7/26
[52] U.S. Cl. .................... 430/321; 430/945; 430/495; 428/65; 369/282
[58] Field of Search ............ 430/321, 320, 945, 495; 428/65; 369/282, 284

[56] References Cited

U.S. PATENT DOCUMENTS

| | | | |
|---|---|---|---|
| 4,315,723 | 2/1982 | Antoine et al. | 245/110 |
| 4,565,772 | 1/1986 | Takeoka et al. | 430/320 |
| 4,668,550 | 5/1987 | Tajima et al. | 428/65 |
| 4,716,063 | 12/1987 | Uehara et al. | 428/65 |
| 4,911,968 | 3/1990 | Higasihara et al. | 428/65 |
| 5,085,910 | 2/1992 | Matsushima et al. | 428/65 |

FOREIGN PATENT DOCUMENTS

| | | |
|---|---|---|
| 0189905 | 8/1986 | European Pat. Off. . |
| 0440215 | 8/1991 | European Pat. Off. . |
| 59-028257 | 2/1984 | Japan ............ 430/320 |
| 2-166645 | 6/1990 | Japan ............ 369/284 |
| 2-249154 | 10/1990 | Japan . |

Primary Examiner—Charles L. Bowers, Jr.
Assistant Examiner—John A. McPherson
Attorney, Agent, or Firm—Sughrue, Mion Zinn, Macpeak & Seas

[57] ABSTRACT

An optical recording disk in which a transfer layer having grooves made of ultraviolet setting resin is laminated on the surface of a substrate, and in which a recording layer is laminated on the transfer layer, the optical recording disk comprises a peeling protrusion projectingly provided on the inner circumferential side of the transfer layer.

3 Claims, 3 Drawing Sheets

OPTICAL RECORDING DISK AND MANUFACTURING METHOD THEREOF

BACKGROUND OF THE INVENTION

The present invention relates to an optical recording disk and a manufacturing method thereof, and more particularly, it relates to an optical recording disk which is superior in quality, which is good in yield, and which can be easily manufactured, as well as a manufacturing method thereof.

Conventional methods in which concentric or spiral grooves for tracking are formed in the surface of a substrate, include a method in which a substrate and grooves are integrally formed through plastic injection molding, and a so-called 2P (Photo-Polymerization) method in which a transfer layer having grooves therein is provided on a substrate.

Of those two methods, in the latter 2P method, manufacturing is made through the steps as shown in FIGS. 5 through 9. In FIG. 5, after ultraviolet setting resin 2 is applied onto a groove forming original disk A (hereinafter referred to "a stamper") or a substrate which is made of optical glass or acrylic resin, then, the stamper A and the substrate 1 are pressed together. Thereafter, as shown in FIG. 6, ultraviolet rays 3 are radiated through the substrate 1 to thereby harden the ultraviolet setting resin 2. After completion of the hardening reaction, the ultraviolet setting resin integrated with the substrate 1, that is, a transfer layer 4, is peeled from the stamper A, so that the groove pattern of the stamper A is transfer-duplicated on the surface of the hardened transfer layer 4, as shown in FIG. 7. A recording layer 5 is laminated on the surface of the transfer layer 4, as shown in FIG. 8, and another substrate 8 is bonded onto the recording layer 5 through an adhesive-agent layer 7, thereby manufacturing an optical recording disk, as shown in FIG. 9.

In the transfer duplicating step for forming grooves in manufacturing an optical recording disk as described above, first, the ultraviolet setting resin 2 which is a material of the transfer layer is dropped onto the stamper A or the substrate 1 as shown in FIG. 10, and the stamper A or the substrate 1 is rotated so that the ultraviolet setting resin 2 is annularly applied to thereby form a ring portion 10.

Next, as shown in FIG. 6, the stamper A and the substrate 1 are pressed on each other so that the ultraviolet setting resin 2 is extended between the stamper A and the substrate 1, as shown in FIG. 11, and then the ultraviolet setting resin is hardened through radiation of ultraviolet rays to thereby form the transfer layer 4. In order to peel the transfer layer 4 from the stamper A, for example, a pair of grasping pads grasp an inner hole 70 of the substrate 10 from their opposite outer sides. After that, a peeling gas such as a nitrogen gas or the like is supplied to the inner circumferential side of the disk, so that the transfer layer 4 integrated with the substrate 1 is peeled from the stamper A.

However, this conventional transfer duplicating step has a problem that, in order to supply a peeling gas such as nitrogen gas or the like into the inner circumferential side of the transfer layer 4, it is necessary to lift up the inner circumferential side of the transfer layer 4 so as to peel the small portion of the transfer layer 4 from the stamper A. For the purpose of peeling, a large pressure is required, and if the pressure is not correctly applied, breakage and damage of the substrate can result.

SUMMARY OF THE INVENTION

In view of the circumstances as described above, an object of the present invention is to provide an optical recording disk in which transfer duplication can be easily performed without requiring a high pressure peeling gas and in which the yield is greatly improved, as well as to provide a manufacturing method thereof.

In order to attain the above object, according to the present invention, in an optical recording disk in which a transfer layer having grooves made of ultraviolet setting resin is laminated on the surface of a substrate, and in which a recording layer is laminated on the transfer layer, a peeling protrusion is projectingly provided at a suitable portion on the inner circumferential side of the transfer layer.

The method of manufacturing such an optical recording disk as defined above is characterized in that after ultraviolet setting resin is annularly applied onto a groove forming original disk, or a substrate so as to form a ring portion, and the ultraviolet setting resin is dropped onto the disk in the vicinity of the inner circumferential side of the ring portion so as to form a dropped portion, the original disk and the substrate are pressed together so as to connect the ring portion and the dropped portion so that a ring-like transfer layer is formed. A peeling protrusion is projectingly provided on the inner circumferential side of the transfer layer, and after the transfer layer and the peeling protrusion are hardened through ultraviolet exposure, the peeling protrusion is engaged with a peeling engagement member moving in an axial direction of the substrate, and the peeling protrusion and the peeling engagement member move in relatively so as to obtain being a peeling operation. After that, the transfer layer is completely peeled from the original disk by the application of an external force.

In the configuration as described above, the mechanical engagement of the protrusion with the inner circumferential side of the transfer layer allows the peeling chance as a starting point to be easily obtained by forcedly lifting up the protrusion.

DATAILED DESCRIPTION OF THE PREFERRED EMBODIMENTS

Figure 1:
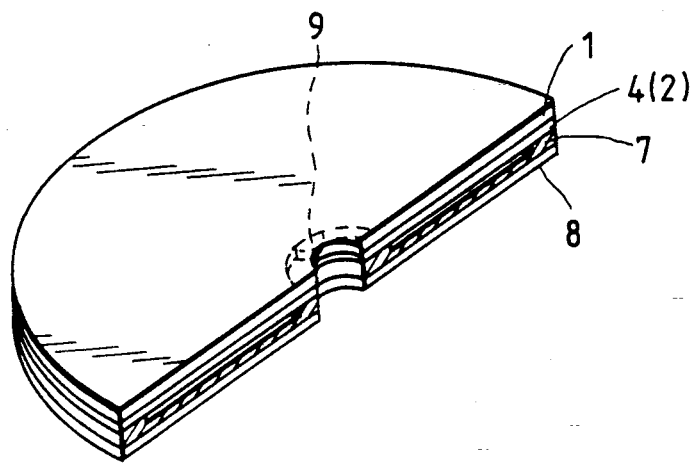
FIG. 1 is a schematic perspective section of the optical recording disk according to the preferred embodiment of the present invention.

Referring to the drawings, an embodiment of the present invention will be described hereunder.

Figure 2:
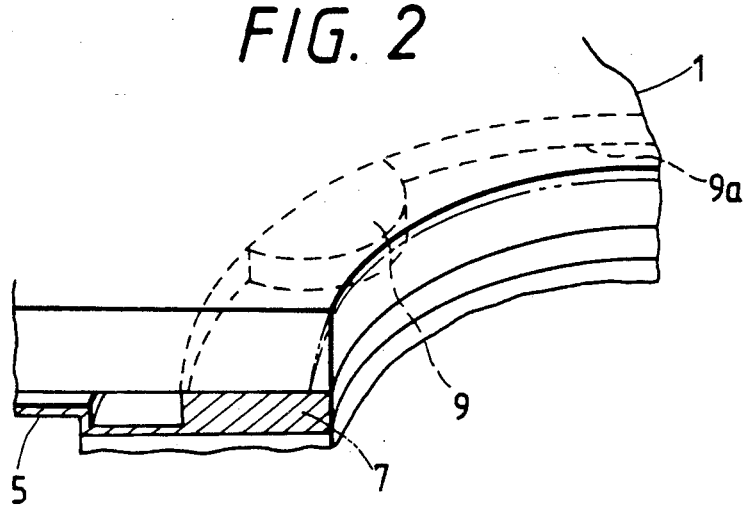
FIG. 2 is an enlarged perspective view of a main portion of FIG. 1.

FIG. 1 is a schematic perspective sectional view of the optical recording disk according to the present invention, and FIG. 2 is an enlarged perspective view of a main portion of FIG. 1. The embodiment will be described with the same portions as those in the conventional optical recording disk correspondingly referenced.

The optical recording disk according to the present invention is constituted by a substrate 1 made of optical glass, acrylic resin, or the like, a transfer layer 4 having grooves made of ultraviolet setting resin and being laminated on the surface of the substrate a recording layer 5 laminated on the surface of the transfer layer 4, and a substrate 8 (a protecting layer) bonded on the surface of the recording layer 5 through an adhesive agent layer 7.

In this case, a peeling protrusion 9 is projectingly provided on the transfer layer 4 at its inner circumferential side. A top end of the protrusion 9 is positioned behind the inner diameter of the substrate 8. Accordingly, a step portion 9a is formed on the inner circumferential edge of the transfer layer 4 including the protrusion 9. However, this step portion 9a is generally filled with a part of the composition of the recording layer 5 or the adhesive-agent layer 7, and, therefore, the protrusion 9 is hidden in the resulting optical recording disks.

For the recording layer 5, it is possible to use any of various materials, for example, such as a photomagnetic recording material, an optical recording material by means of pit formation or phase change, etc., which can perform light recording.

In such a configuration as described above, since the peeling protrusion 9 is projectingly provided on the inner circumferential side of the transfer layer 4, a part (not-shown) for supporting the inner circumference of the substrate is lifted up to thereby make a peeling chance so that the protrusion 9 is pushed up while being engaged with the part, in the transfer duplicating step for forming the grooves. Thereafter, complete peeling is performed by the pressure of a gas such as a nitrogen gas supplied from the inner circumferential side from the raised protrusion 9 as a starting point. Thus, the transfer layer 4 can be easily peeled from the stamper A.

The protecting layer 8 is generally made of optical glass or acrylic resin similarly to the substrate 1. In the present invention, the number of the peeling protrusions is not limited to one but two or more peeling protrusions may be provided so long as they are projected at least on the inner circumferential side of the transfer layer.

Referring to FIGS. 3, 4, 5, and 6, the optical recording disk manufacturing method according to the present invention will be described hereunder.

Figure 3:
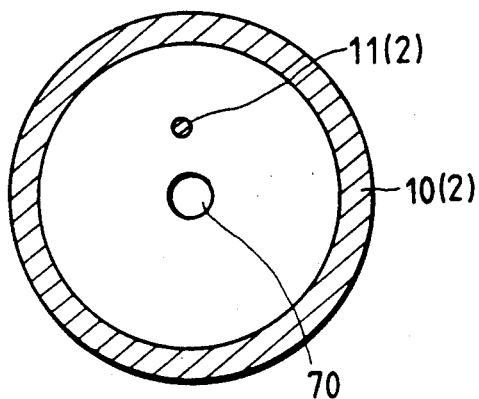
FIG. 3 is a schematic view for explaining an ultraviolet setting resin applying step in the manufacturing method according to the preferred embodiment of the present invention.
Figure 5:
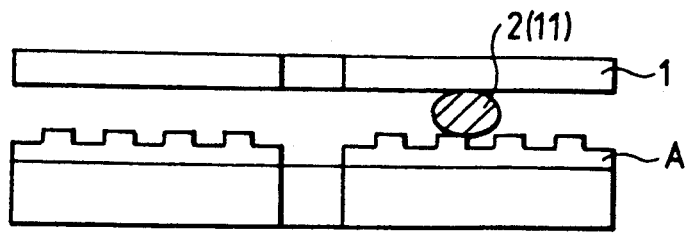
FIG. 5 is a schematic sectional view showing the state in which the ultraviolet setting resin is dropped.

First, as shown FIGS. 3 and 5, ultraviolet setting resin 2 is dropped onto the upper surface of the rotating stamper A so that the ultraviolet setting resin is annularly applied so as to form a ring portion 10. After the stamper A is stopped from rotating, the ultraviolet setting resin 2 is dropped onto the vicinity of the inner circumferential side of the disk to thereby form a dropped portion 11.

Figure 4:
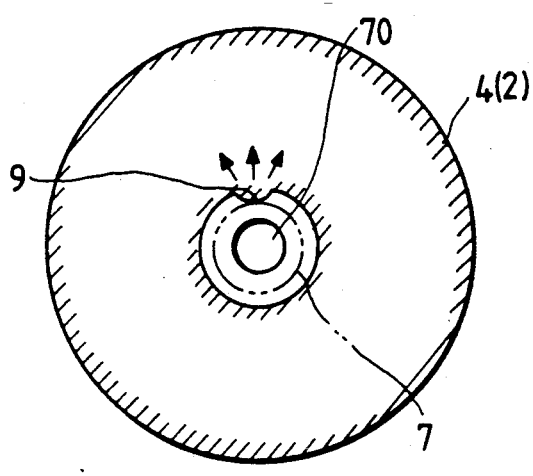
FIG. 4 is a schematic view for explaining a transfer duplicating step in the manufacturing method according to the present invention.

Next, the substrate 1 is pressed to the stamper A from the upper direction of the stamper A. As a result, as shown in FIG. 4, the ring portion 10 and the dropped portion 11 are connected to each other, so that the ring-like transfer layer 4 is formed and simultaneously the peeling protrusion 9 is projectingly formed on the inner circumferential side of the transfer layer 4.

Figure 6:
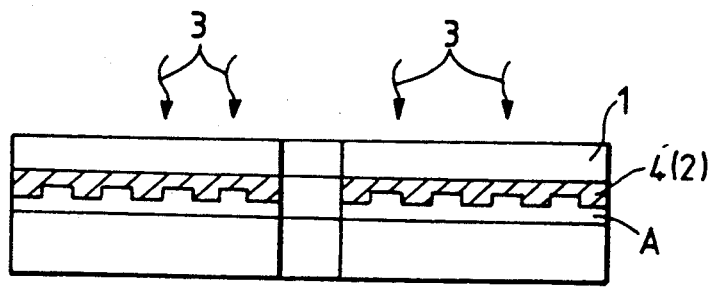
FIG. 6 is a schematic sectional view of an ultraviolet exposure step.
Figure 7:
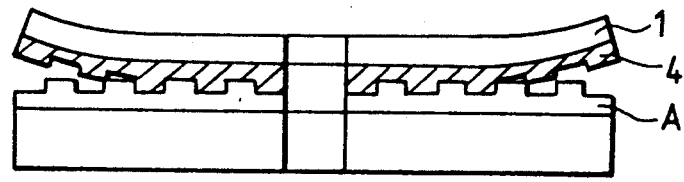
FIG. 7 is a schematic sectional view of the transfer duplicating step.
Figure 8:
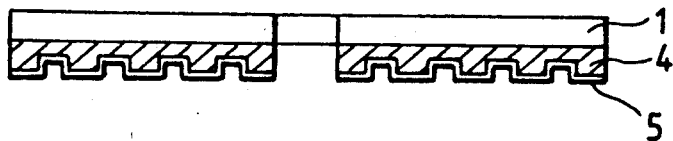
FIG. 8 is a schematic sectional view of a recording-film forming step.
Figure 9:
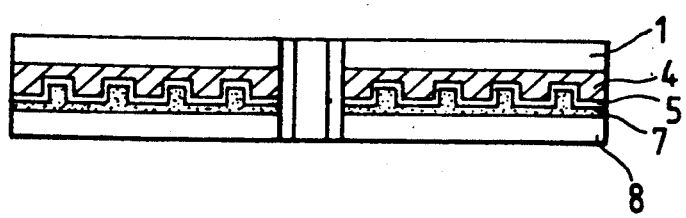
FIG. 9 is a schematic sectional view of an assembling step.
Figure 10:
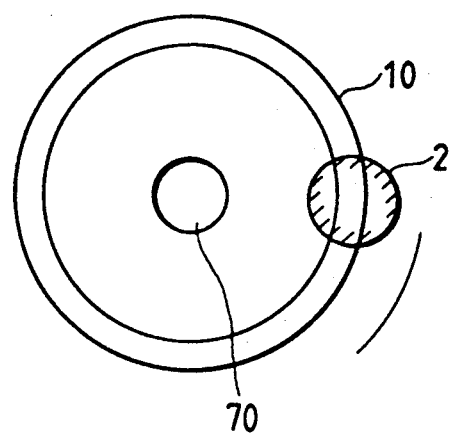
FIG. 10 is a schematic view for explaining the ultraviolet resin applying step in the conventional manufacturing method.
Figure 11:
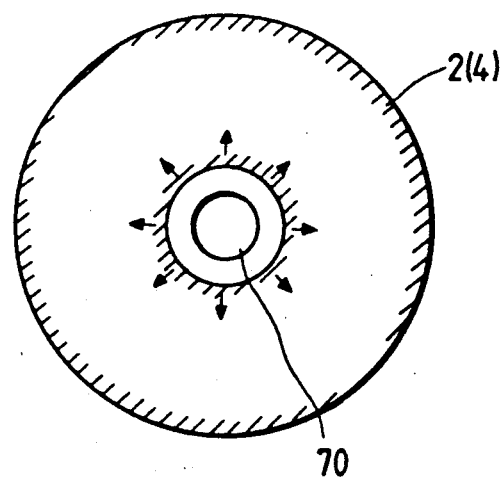
FIG. 11 is a schematic view for explaining the transfer duplicating step in the conventional manufacturing method.

As shown in FIG. 6, in the case where the stamper A and the substrate is pressed on each other, if ultraviolet rays 3 are radiated through the substrate 1, the ultraviolet setting resin of the transfer layer 4 and the peeling protrusion 9 is hardened.

After completion of the setting reaction, the not-shown part for supporting the inner circumference support of the substrate is lifted up, so that the protrusion 9 engaged with the part is pushed up thereby starting the peeling the transfer layer 4 from the stamper A. Then, a pair of not-shown grasping portions pads grasp of an inner hole 70 of the substrate 10 from opposite outer sides, and a peeling gas is supplied onto the inner circumferential side of the disk, so that the transfer layer 4 is completely peeled from the stamper A and the groove shape transfer duplicating step is completed, as shown in FIG. 4.

After completion of the groove shape transfer duplication, similarly to the conventional method, the recording layer 5 is laminated on the transfer layer 4, and the protecting layer 8 which is another substrate is bonded to the recording layer 5 through the adhesive-agent layer 7 to thereby complete the manufacturing of the optical recording disk.

Although description has been made as to the case in which the ultraviolet setting resin 2 is dropped so as to be annularly applied onto the upper surface of the stamper A in the above embodiment, the ultraviolet setting resin 2 may be similarly dropped onto the upper surface of the substrate 1 in place of the stamper A. Further, although description has been made as to the case in which one peeling protrusion 9 is provided in the above embodiment, a plurality of such peeling protrusions 9 may be provided.

Since the present invention is constituted in a manner as described above, the transfer layer and the stamper can be easily peeled from each other by means of the peeling protrusion projected on the inner circumferential side of the transfer layer in which the grooves are formed. Further, it is possible to provide an optical recording disk which has a substrate that is never broken or damaged, which has a good yield, and which is superior in quality.

What is claimed is:

1. A method of manufacturing an optical recording disk comprising the steps of:
   annularly applying an ultraviolet setting resin onto one of a groove forming original disk and a substrate so as to form a ring portion;
   dropping said ultraviolet setting resin onto at least one of said disk and said substrate in the vicinity of an inner circumferential side of said ring portion so as to form a dropped portion;
   pressing said original disk and substrate together so as to connect said ring portion and said dropped portion;

forming a ring-like transfer layer and a peeling protrusion which is projectingly provided on an inner circumferential side of said transfer layer;

hardening said transfer layer and said peeling protrusion through ultraviolet exposure;

engaging said peeling protrusion with a peeling engagement member which is movable in an axial direction of said substrate;

moving said peeling protrusion and said peeling engagement member relatively so as to start a peeling operation; and completely peeling said transfer layer from said original disk by applying an external force.

2. An optical recording disk in which a transfer layer having grooves made of ultraviolet setting resin is laminated on the surface of a substrate, and in which a recording layer is laminated on said transfer layer, said optical recording disk comprising:

a peeling protrusion integrally formed on an inner circumferential side of said transfer layer so as to project therefrom.

3. An optical recording disk as claimed in claim 2, wherein said protrusion is semicircle shaped.

* * * * *